Patented Nov. 27, 1923.

1,475,471

UNITED STATES PATENT OFFICE.

ROBERT L. CORBY, OF CHEVY CHASE, MARYLAND, AND RUTH GLASGOW, OF PITTSBURGH, OF PENNSYLVANIA, ASSIGNORS, BY MESNE ASSIGNMENTS, TO THE FLEISCHMANN COMPANY, A CORPORATION OF OHIO.

PROCESS OF MANUFACTURING YEAST.

No Drawing. Application filed March 13, 1919. Serial No. 282,506.

*To all whom it may concern:*

Be it known that we, ROBERT L. CORBY and RUTH GLASGOW, citizens of the United States, residing, respectively, at Chevy Chase, in the county of Montgomery and State of Maryland, and Pittsburgh, in the county of Allegheny and State of Pennsylvania, have invented certain new and useful Improvements in Processes of Manufacturing Yeast, of which the following is a specification.

This invention relates to a process of manufacturing yeast, and particularly bakers' yeast, from a nutrient solution containing essentially sacchariferous material and other yeast nutrients, including cereal material and compounds containing yeast-assimilable inorganic nitrogen, in a manner which may be easily and efficiently carried out.

It is accordingly an object of this invention to manufacture yeast from a nutrient solution of the above mentioned type in a manner such as materially to increase the yield and strength of the yeast when compared with that hiterto obtained by processes employing such nutrients, whereby substantial economies are obtained.

Heretofore yeast has been manufactured commercially in large quantities from cereals such as barley, rye, corn and malt from which a yeast nutrient has been prepared by saccharification and extraction with water, commonly with acidification or souring by the action of lactic acid bacteria or other suitable souring agent. A yeast nutrient solution or wort prepared in the usual manner from cereals contains not only saccharine substances which are of value as yeast foods but also contains various nitrogenous materials some of the nitrogen in which is assimilable by the yeast and still further contains mineral salts a portion of which are of value as yeast foods. For example it has been found in ordinary commercial practice of yeast production that for the obtainment of 2000 pounds of yeast there has been required in the ordinary well-known clear wort or aeration yeast production process, as heretofore practiced, approximately 7000 pounds of cereal substances such as those mentioned above mixed together in usual well-known portions, together with a suitable quantity of water.

We have discovered that by substituting various individual chemical compounds, such for example as ammonium salts and suitable phosphates added to or formed in the yeast nutrient, together with a saccharine solution, such as molasses, in place of the greater portion of soluble cereal derivatives previously used in yeast manufacture, as above referred to, it is not only rendered possible to readily obtain a more accurately balanced ration of different yeast nutrient materials, but it is also possible to obtain a marked increase in the yield of yeast which is produced from a particular quantity of fermentable sugars present with the other materials in the nutrient.

The following is an example of the manner in which our process may be carried out. We form a mash mass from water and the usual cereal materials which mash mass however contains only such an amount of the cereal materials as will supply from 10% to 50% of the total amount of fermentable sugars which are to be contained in the fully prepared yeast nutrient at the time of addition of seed yeast thereto and which are usually present in a cereal wort. We prefer to employ as such cereal materials, the usual relative proportions of rye, barley malt and sprouts or other cereal materials of the kind heretofore used in accordance with the well-known practice of yeast manufacture from cereal-derived worts.

We then add a mass of saccharine matter (obtained otherwise than by the saccharification of cereals) as a substitute for the large proportion of saccharine materials ordinarily derived from the starch bodies of the cereals. Relatively inexpensive saccharine materials can be substituted, such as, for example, molasses, which is obtainable in the market at a relatively low cost, and contains a large proportion of invert sugars, as dextrose and levulose, as well as a small percentage of cane sugar. Although introduced in a large quantity the expense thereof is much below that incident to treating the omitted part (from fifty to ninety percent or thereabouts) of the initial cereals ordinarily used when following the process first above described.

For example, such a mash mass may contain six to seven thousand gallons of water, from five hundred to three thousand pounds of cereals, and from three to four thousand pounds of molasses or equivalent.

This mass, in a suitable receptacle, is subjected to conditions in a well-known manner suitable for saccharifying the relatively small amount of starch component. During this treatment the ingredients of the mass become quite thoroughly mixed and the solids the cereal matter, the newly saccharified ingredients, the proteins or nitrogenous materials, (soluble and insoluble), the added saccharine materials and the mineral salts (in the cereals and the added saccharines) are uniformly distributed.

After the mass above described has been saccharified, as set forth, it is (while in the original containers or in others adapted to receive it) subjected to an acidifying treatment. For this purpose any of several acids can be used. We here call particular attention to sulphuric acid which we have used in relatively small percentages. In general terms it can be stated that with an acid of this strength the acidity should be initially raised to .5° or thereabouts, that is to say, to such a degree of acidity that a 20 cc. sample of the material will be neutralized by about .5 cc. of a normal alkali solution. The mass is subjected to agitation for a sufficient length of time to effect a thorough dissemination of the dilute acid throughout. The acid acts in a number of ways; it tends to re-act with components of the molasses and slightly to acidify the saccharine body. It also assists in putting components of the mass into yeast-assimilable condition.

It is apparent, however, that, if desired, an organic acid, for example, lactic acid, may be used in lieu of sulphuric acid in order to acidify the mash. Such acidification may be accomplished either by the addition of the acid to the mash or by the formation of the acid in the mash through the action of suitable micro-organisms, such as, for example, lactic acid bacteria, thereon. In either case, the initial acidification (as determined by the test above stated) should, in the case of lactic acid, be brought up to, say, for example, .8° or 9°. It has been noted that we omit, at the first stage, a large proportion (from fifty to ninety percent) of the usual cereal materials. Since, however, the relative proportions of the cereals usually used are maintained, there is also a loss or omission of a large amount of nitrogenous matter comprising yeast-assimilable nitrogen which the omitted cereals contain. After the mass has been acidified to the proper degree, we replace this missing yeast-assimilable nitrogen by the addition of a suitable substance containing yeast-assimilable nitrogen. There are a number of such substances which we have discovered can be used, such as, for example, ammonia and ammonium salts. The ammonia can be used in cases where the acid was sufficiently in excess at the time of acidification, the excess acid forming an ammonium salt with the ammonia. If sulphuric acid be the acid used for acidification the salt formed is ammonium sulphate. Instead of this procedure, in order to have an ammonium salt present, one of the salts of commerce can be added, such as, for example, ammonium phosphate and ammonium sulphate. Since the latter salt is relatively inexpensive and easily available, and, since it yields its nitrogen readily to the yeast, we have found it to be well adapted for the purposes required.

The ammonium salt is added in such proportion relative to the cereals as to replace the missing yeast-assimilable nitrogen, so that a resultant mass is obtained which has substantially the same relative amounts of yeast-assimilable nitrogen and sugars that such mass would contain if prepared from cereal materials in the manner above described.

In either case, whether ammonium sulphate, or equivalent, be formed within the mass, or it be added as a separately formed body, there should be from one hundred to two hundred pounds in a mass such as aforesaid.

We also add to the mass, mineral salts as substitutes for those which have been lost by cutting down the quantity of the original cereal mass. The quantities of these we vary to meet varying conditions. We select proper quantities of such salts as sodium phosphate, a soluble calcium phosphate, and potassium phosphate. In a mass such as above indicated there are introduced from five to fifty pounds of calcium phosphate and from twenty to seventy five pounds, each, of the sodium phosphate and potassium phosphate.

After the various salts have been introduced the fluid mass is filtered and the undissolved substances are thus separated from the solution. As there is a tendency for a considerable percentage of the solvent fluid and of the materials in solution to adhere to the solids that are separated out by the filter apparatus, the solids are again subjected to the action of water and the resulting diluted solution is added to the first filtrate in order that as much as possible of the valuable soluble yeast nutrient substances may be recovered. The added water acts by dilution to lower the degree of acidity, this being one reason why at the time of acidification there is employed a considerable excess of acid over that best suited for yeast propagation. In the case of sulphuric acid the acidity (testing as above referred to) is reduced by the above mentioned dilution from .5° to .2°; or in the case of lactic acid, the solution is diluted from approximately .8° to .3°, such acidities being those which are preferably initially present in the fermenters, and, since in the practice of our invention we substantially neutralize only that acidity which is released from the salts during propagation, the initial degree of acidity is maintained approximately constant throughout the period of propagation.

A mass of the sort referred to can be regarded as having the following ingredients, with the capability of carrying out our invention, namely, the seven thousand gallons of water, of the earlier stages, together with the customary amount added at the time of filtering and washing, making a total of fourteen thousand gallons or thereabouts; four thousand to five thousand pounds of molasses, two hundred pounds of ammonium sulphate, together with such salts as above referred to as are found necessary, as calcium phosphate, sodium phosphate and potassium phosphate.

And if, for example, ten per cent of the products of an ordinary grain mash procedure are also present there will be included mash derivatives of seven hundred pounds, more or less from the cereal matters hereinbefore referred to.

The nutrient fluid having been prepared as above described, it is, at proper temperature, delivered to the fermenters and the seed yeast is added.

The yeast obtains the nitrogen necessary for cell structure from the ammonium salt, whether the latter be formed in the mass or be separately formed and introduced. Consideration must be given, however, to the effect of the acid components released from the salt at the time the nitrogen component is disassociated and utilized by the yeast. If the salt is one having a relatively strong acid as a component, the quantity of the latter which is released must not at any time be great enough, and it must not be free long enough, to have a toxic effect on the yeast organisms. There must be employed sufficient antacid reagents to effect practically a constant neutralization of excess acid as formed. There are a number of antacid materials which can be used as reagents for this purpose, but we have found lime to be the most available and generally employ it. We introduce it in such proportions as to maintain approximately a constant neutralization of excess acid set free so that the acid will not have any toxic effect in relation to the yeast.

With a nutrient medium formed substantially as above described we have obtained an increase of twenty per cent and more in the quantity of yeast produced from the same amount of sugars present as compared with the yield obtained from a nutrient formed from cereals in the ordinary way first above described. As already remarked, care must be taken to maintain the proper proportions between the saccharine material (including that added in lieu of that ordinarily obtained by saccharification), the yeast-assimilable nitrogen (including that present in the added ammonium salt), and the phosphates or other inorganic salts introduced to replace those in the missing cereals. One of the advantages incident to the addition of measured predetermined quantities of the nitrogen bearing material is that we can accurately maintain the necessary ratio between the yeast-assimilable nitrogen and the sacchariferous substances. There are wide variations in the ratio of these components in one mass of cereals (such as used in yeast manufacture), when compared with the ratio thereof in another mass. These variations no doubt result from various causes, as, for example, from differences in seasons which affect the growth of the cereals, or from variations in exposure conditions after harvesting, such as variations in temperatures or humidity.

For these reasons, when following the older process above described, wide variations in yields of yeast were caused by these varying precedent conditions affecting the cereals in the several masses, owing to the incident practical difficulty of obtaining and combining such various cereal materials as might form a properly balanced yeast food. By our present process, however, after ascertaining the amount of yeast-assimilable nitrogen available in each of the masses of cereals, we can calculate on the basis of appropriate tests the quantity of yeast-assimilable nitrogen which must be added to bring the ratio of yeast-assimilable nitrogen to that of the sacchariferous substances up to that usually present in a cereal wort. The necessary amount of an ammonium salt which must be supplied to accomplish this result can then be correctly measured and added.

In respect to the mineral salts (phosphates, or the like) above referred to: we can also accurately ascertain the amounts required to bring the total up to that usually present in a cereal wort and the necessary amounts may then be added.

We have above described one method of procedure and a sequence of steps and have specified certain materials, acids, salts, reagents, etc., and proportions which can be used, etc., in carrying out the invention, but it will be understood that there can be variations in all of these respects without departing from the invention.

Again the sequence above presented may be departed from; the ammonium salt or equivalent may be, as a whole or partially, introduced at the time of making the first mixture, or may be introduced after the stage of filtration. The reagent intended for the maintaining of approximate neutralization may be introduced intermittently or at different stages as found advantageous; it being understood that the use of such reagent as well as its character and quantity depend upon the strength of the acid released and upon its toxic effect in relation to the same. Nor do we limit ourselves to the matter which we have above described as desirable, namely, having in the mass derivatives from cereal produced by a saccharification process immediately precedent to the introduction of the yeast, as the equivalents of such derivatives can be obtained from outside sources and introduced.

Having described our invention, what we claim as new and desire to secure by Letters Patent, is:

1. The process of manufacturing yeast which comprises preparing a yeast nutrient solution containing essentially saccariferous material and other yeast nutrients, including cereal material and a compound containing inorganic nitrogen, rendering the solution initially slightly acid to a degree favorable to yeast growth, propagating yeast therein, such compound containing inorganic nitrogen being adapted to supply assimilable nitrogen to the yeast and, during such assimilation, to set free components which tend increasingly to acidify the nutrient solution, and during the propagation maintaining the acidity of the solution approximately constant.

2. The process of manufacturing yeast which comprises preparing a yeast nutrient solution containing essentially molasses and other yeast nutrients, including cereal material and a compound containing inorganic nitrogen, rendering the solution initially slightly acid to a degree favorable to yeast growth, propagating yeast therein, such compound containing inorganic nitrogen being adapted to supply assimilable nitrogen to the yeast and, during such assimilation, to set free components which tend increasingly to acidify the nutrient solution, and during the propagation maintaining the acidity of the solution approximately constant.

3. The process of manufacturing yeast which comprises preparing a yeast nutrient solution containing essentially saccariferous material and other yeast nutrients, including cereal material and a compound containing inorganic nitrogen, rendering the solution initially slightly acid to a degree favorable to yeast growth, propagating yeast therein, such compound containing inorganic nitrogen being adapted to supply assimilable nitrogen to the yeast and, during such assimilation, to set free components which tend increasingly to acidify the nutrient solution, and during the propagation maintaining the acidity of the solution approximately constant by the addition of an antacid substance.

4. The process of manufacturing yeast which comprises preparing a yeast nutrient solution containing essentially saccariferous material and other yeast nutrients, including cereal material and a compound containing inorganic nitrogen, rendering the solution initially slightly acid to a degree favorable to yeast growth, propagating yeast therein, such compound being adapted to supply assimilable nitrogen to the yeast and, during such assimilation, to set free components which tend increasingly to acidify the nutrient solution, and during the propagation maintaining the acidity of the solution approximately constant by the fractional addition of an antacid substance.

5. The process of manufacturing yeast which comprises preparing a yeast nutrient solution containing essentially saccariferous material and other yeast nutrients, including cereal material and a compound containing inorganic nitrogen, rendering the solution initially slightly acid to a degree favorable to yeast growth, propagating yeast therein, such compound containing inorganic nitrogen being adapted to supply assimilable nitrogen to the yeast and, during such assimilation, to set free components which tend increasingly to acidify the nutrient solution, and during the propagation maintaining the acidity of the solution approximately constant by the addition of a calcium compound having alkaline reaction.

6. The process of manufacturing yeast which comprises preparing a yeast nutrient solution containing essentially saccariferous material and other yeast nutrients, including cereal material and a compound containing inorganic nitrogen, rendering the solution initially slightly acid to a degree favorable to yeast growth, propagating yeast therein, such compound containing inorganic nitrogen being adapted to supply assimilable nitrogen to the yeast and, during such assimilation, to set free components which tend increasingly to acidify the nutrient solution, and during the propagation maintaining the acidity of the solution approximately constant by the fractional addition of lime.

7. The process of manufacturing yeast which comprises preparing a yeast nutrient solution including such amounts of cereal material, saccariferous material, and water, that the resultant solution contains substantially the same amount of saccariferous material and a less amount of yeast-assimilable nitrogen than the amount usually present in a cereal wort, supplying the missing yeast-assimilable nitrogen by the addition of a compound containing yeast-assimilable inorganic nitrogen, rendering the solution initially slightly acid to a degree favorable to yeast growth, propagating yeast therein, and during the period of propagation maintaining the acidity of the solution approximately constant.

8. The process of manufacturing yeast which comprises preparing a yeast nutrient solution containing essentially saccchariferous material, yeast-assimilable organic nitrogen and yeast nourishing salts, including a compound containing inorganic nitrogen, rendering the solution initially slightly acid to a degree favorable to yeast growth, propagating yeast therein, such compound containing inorganic nitrogen being adapted to supply assimilable nitrogen to the yeast and, during such assimilation, to set free components which tend increasingly to acidify the nutrient solution, and during the propagation maintaining the acidity of the solution approximately constant.

In testimony whereof, we affix our signatures.

ROBERT L. CORBY.
RUTH GLASGOW.